(12) United States Patent
Shimanuki et al.

(10) Patent No.: US 10,601,282 B2
(45) Date of Patent: Mar. 24, 2020

(54) ELECTRIC ROTATING MACHINE AND MANUFACTURING METHOD FOR ELECTRIC ROTATING MACHINE

(71) Applicant: KABUSHIKI KAISHA TOSHIBA, Minato-ku (JP)

(72) Inventors: Kenmei Shimanuki, Yokohama (JP); Kazuma Tsujikawa, Kawasaki (JP); Hidetoshi Sugimura, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 333 days.

(21) Appl. No.: 15/494,616

(22) Filed: Apr. 24, 2017

(65) Prior Publication Data
US 2017/0310197 A1    Oct. 26, 2017

(30) Foreign Application Priority Data

Apr. 25, 2016 (JP) .................................. 2016-087020

(51) Int. Cl.
*H02K 15/02* (2006.01)
*H02K 9/08* (2006.01)
(Continued)

(52) U.S. Cl.
CPC ................ *H02K 9/08* (2013.01); *H02K 1/26* (2013.01); *H02K 1/32* (2013.01); *H02K 13/003* (2013.01);
(Continued)

(58) Field of Classification Search
CPC .......... H02K 1/32; H02K 9/10; H02K 13/003; H02K 13/02; H02K 9/005; H02K 3/527;
(Continued)

(56) References Cited

U.S. PATENT DOCUMENTS

| 5,015,895 A * | 5/1991 | Obley | H02K 3/51 174/152 R |
| 5,777,408 A * | 7/1998 | Brem | H02K 9/005 310/71 |
| 8,823,226 B2 * | 9/2014 | Wiebe | H02K 5/124 310/55 |

FOREIGN PATENT DOCUMENTS

| CN | 1102916 A | 5/1995 |
| DE | 951 465 C | 10/1956 |

(Continued)

OTHER PUBLICATIONS

JP-2013017307-A machine translation Jun. 24, 2019.*
Extended European Search Report dated Sep. 4, 2017 in European Patent Application No. 17167714.9.

*Primary Examiner* — Jermele M Hollington
*Assistant Examiner* — Leda T Pham
(74) *Attorney, Agent, or Firm* — Oblon, McClelland, Maier & Neustadt, L.L.P.

(57) ABSTRACT

A gas cooled electric rotating machine is provided in which a cooling gas is flowed through into a rotor and a stator. The rotor includes a pair of center hole conductors inserted into a center hole along a center of rotation while being electrically insulated from a shaft and from each other, the center hole conductors including respective protruding parts protruding toward an end of the shaft. The rotor includes a pair of end conductors provided at the end of the shaft so as to be each electrically insulated from the shaft, the end conductors being electrically connected to side surfaces of the protruding parts of the pair of center hole conductors, the side surfaces serving as electric connection surfaces.

7 Claims, 11 Drawing Sheets

(51) Int. Cl.
    *H02K 1/26*         (2006.01)
    *H02K 13/00*       (2006.01)
    *H02K 1/32*         (2006.01)
    *H02K 13/02*       (2006.01)
    *H02K 9/10*         (2006.01)

(52) U.S. Cl.
    CPC ............ *H02K 13/02* (2013.01); *H02K 15/02* (2013.01); *H02K 9/10* (2013.01)

(58) Field of Classification Search
    CPC . H02K 9/08; H02K 15/02; H02K 1/26; H01R 39/10
    See application file for complete search history.

(56) References Cited

FOREIGN PATENT DOCUMENTS

| | | |
|---|---|---|
| EP | 0 645 874 A1 | 3/1995 |
| GB | 879165 | 10/1961 |
| JP | 54-6006 U | 1/1979 |
| JP | 55-11782 U | 1/1980 |
| JP | 3-50965 U | 5/1991 |
| JP | 7-184347 A | 7/1995 |
| JP | 2013-17307 | 1/2013 |
| JP | 2013017307 A * | 1/2013 |
| WO | WO 2016/027526 A1 | 2/2016 |

\* cited by examiner

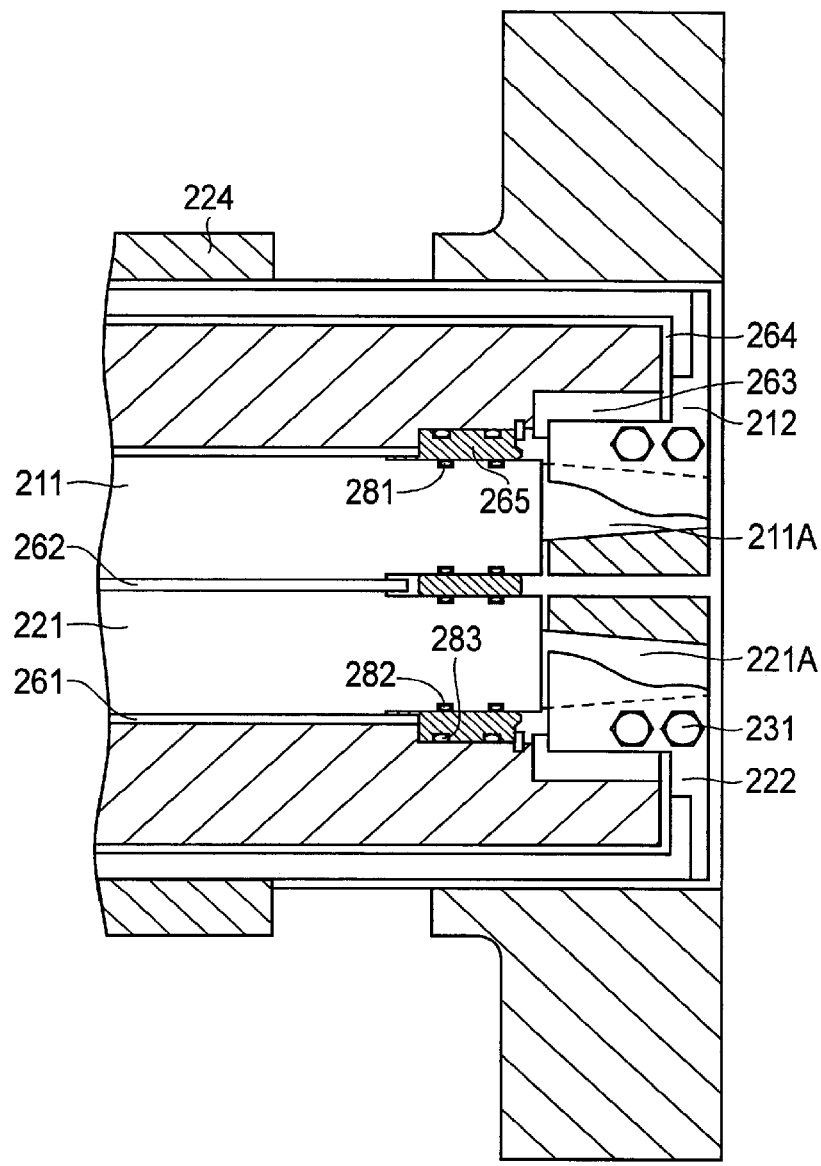
F I G. 8
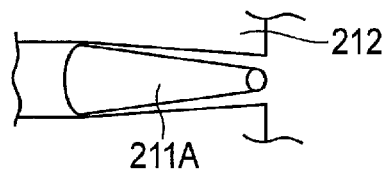
F I G. 9

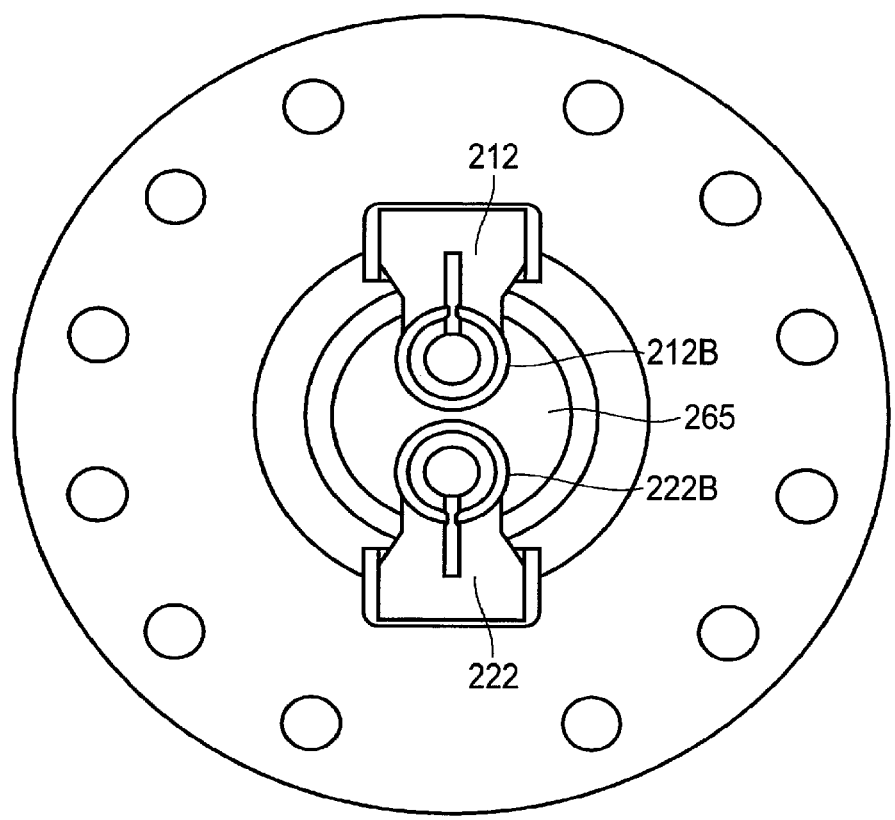
F I G. 14
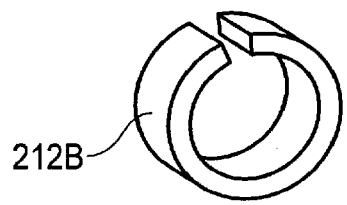
F I G. 15

ELECTRIC ROTATING MACHINE AND MANUFACTURING METHOD FOR ELECTRIC ROTATING MACHINE

CROSS-REFERENCE TO RELATED APPLICATION

This application is based upon and claims the benefit of priority from Japanese Patent Application No. 2016-087020, filed Apr. 25, 2016, the entire contents of which are incorporated herein by reference.

FIELD

Embodiments described herein relate generally to an electric rotating machine and a manufacturing method for an electric rotating machine.

BACKGROUND

A driving machine is connected to one end of a rotor of an electric rotating machine. To excite a core of the rotor, external power is supplied to a collector ring installed at the other end of the rotor. The power is supplied to a rotor coil through studs inserted into holes formed in a shaft in a radial direction and center hole conductors inserted into a center hole in the shaft. An increased output from the electric rotating machine also increases power supplied to the rotor coil, so that a current flowing through the rotor coil also increases. In order to improve thermal efficiency of facilities, a system has recently been beginning to be adopted in which driving machines are connected to opposite ends of the rotor of the electric rotating machine to transmit a driving torque to the rotor through the end of the rotor at which the collector ring is provided. The use of this system involves a high transmission torque applied to an end of a side of the rotor from which power is fed to a field circuit.

Also in a system in which no collector ring is provided and a brushless exciting apparatus is connected instead to the end of the rotor to enhance maintanability, an output from the brushless exciting apparatus increases with the electric rotating machine output increase and as a result transmission torque increases.

For the above-described increased current, each part of the current circuit can be settled by increasing sectional area. For example, for the studs, a sufficient sectional area can be provided according to the increased current by increasing the diameter of each of the studs or the number of the studs to increase the sectional area of the current circuit. However, the shaft needs to have shear strength sufficient to resist a transmission torque applied to the rotor, so the holes which extend from the center hole in the shaft to an outer periphery of the shaft for studs are inhibited from being formed in the shaft depending on the magnitude of the torque. In addition, the diameter of the shaft is inhibited from being increased to increase the shearing strength at the end of the rotor at which the collector ring with a peripheral speed limit is provided.

In a structure that eliminates the need for the radial holes for studs, conductors are arranged in the radial direction of the rotor and bolted and thus electrically connected to the center hole conductors.

However, in this structure, a contact area necessary and sufficient to accommodate the increased current fail to be provided simply by using the area of the end surfaces of the center hole conductors.

BRIEF DESCRIPTION OF THE DRAWINGS

FIG. 8 is sectional view depicting an example of an end of a rotor of the electric rotating machine in a third embodiment;

FIG. 9 is sectional view depicting an example of an end of a rotor of the electric rotating machine in the third embodiment;

FIG. 14 is a sectional view taken along line D-D in FIG. 13 and depicting the example of the end of the rotor in the electric rotating machine in the fifth embodiment;

FIG. 15 is a perspective view depicting the example of the end of the rotor in the electric rotating machine in the fifth embodiment;

DETAILED DESCRIPTION

Figure 1:
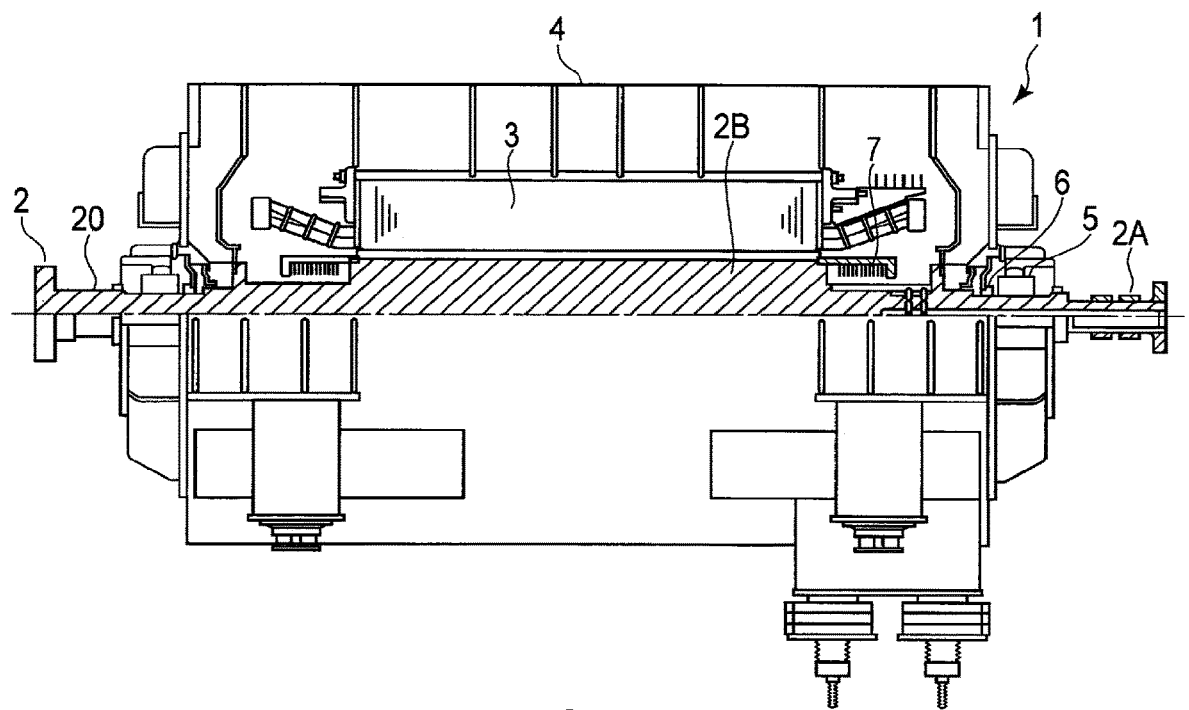
FIG. 1 is a diagram depicting an example of an electric rotating machine in the first embodiment.

In general, according to one embodiment, there is provided a gas cooled electric rotating machine in which a cooling gas is flowed through into a rotor and a stator. The rotor includes a shaft having a center hole formed along a center of rotation of the rotor and a hole for studs formed at a machine interior side of the center hole so as to extend in a radial direction from the center hole to an outer peripheral surface of the rotor to allow the center hole and the outer peripheral surface to communicate with each other. The rotor includes a pair of center hole conductors inserted into the center hole along the center of rotation while being electrically insulated from the shaft and from each other, the center hole conductors including respective protruding parts protruding toward an end of the shaft. The rotor includes a pair of end conductors provided at the end of the shaft so as to be each electrically insulated from the shaft, the end conductors being electrically connected to side surfaces of the protruding parts of the pair of center hole conductors, the side surfaces serving as electric connection surfaces.

Embodiments will be explained below with reference to the accompanying drawings. Note that portions common to these drawings will be denoted by the same reference numerals or the same reference numerals given suffixes, and a repetitive explanation will be omitted as needed.

First Embodiment

Figure 2:
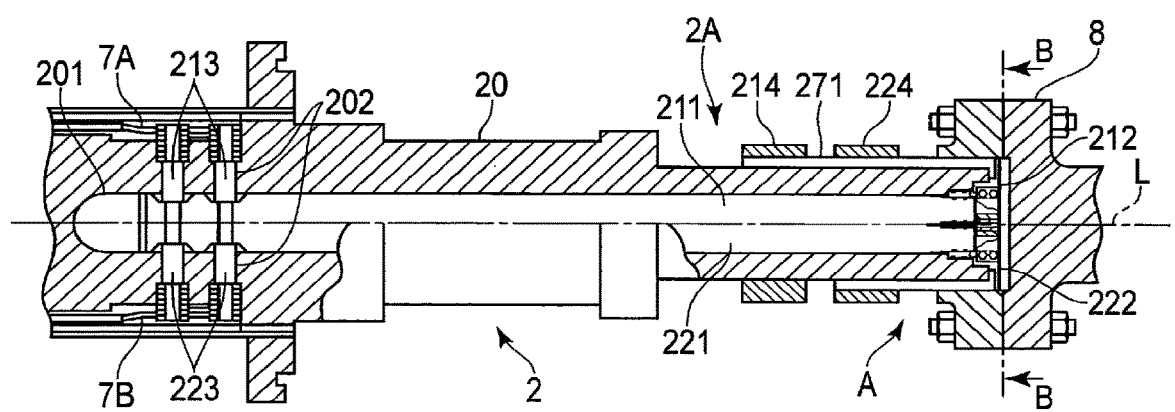
FIG. 2 is sectional view depicting an example of an end of a rotor of the electric rotating machine in a first embodiment.
Figure 3:
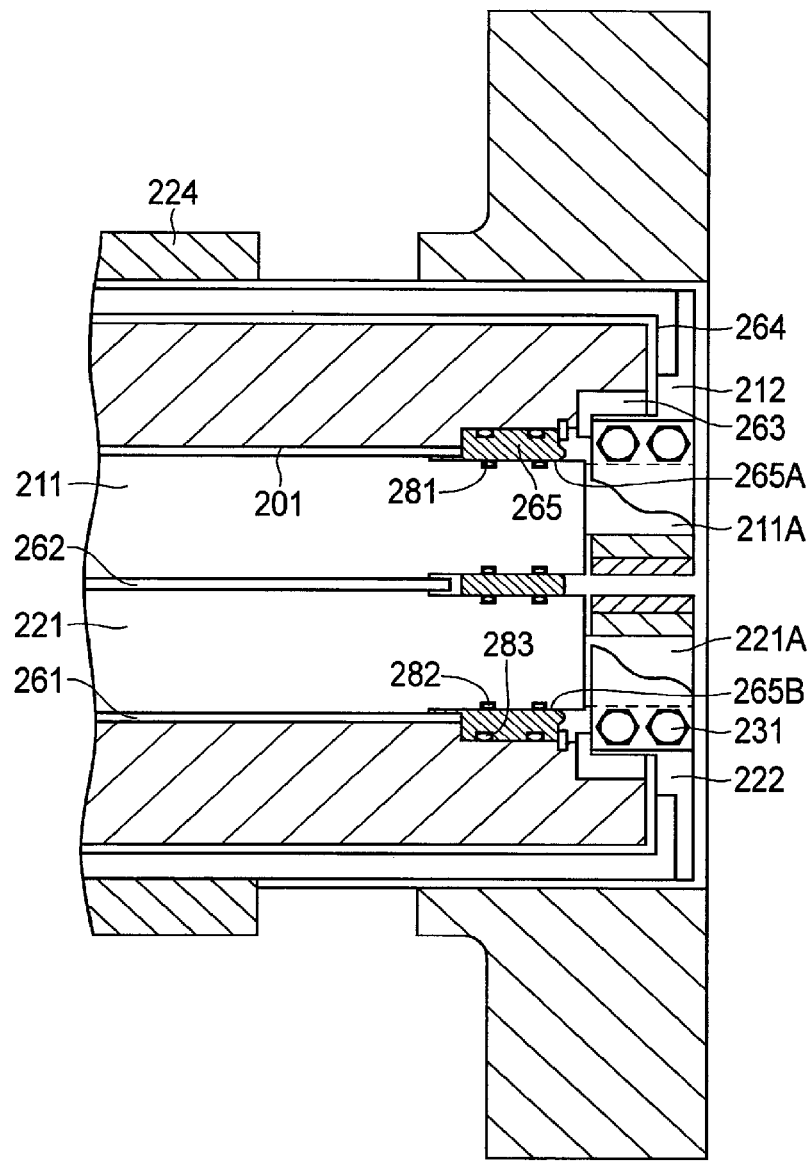
FIG. 3 is sectional view depicting an example of an end of a rotor of the electric rotating machine in the first embodiment.
Figure 4:
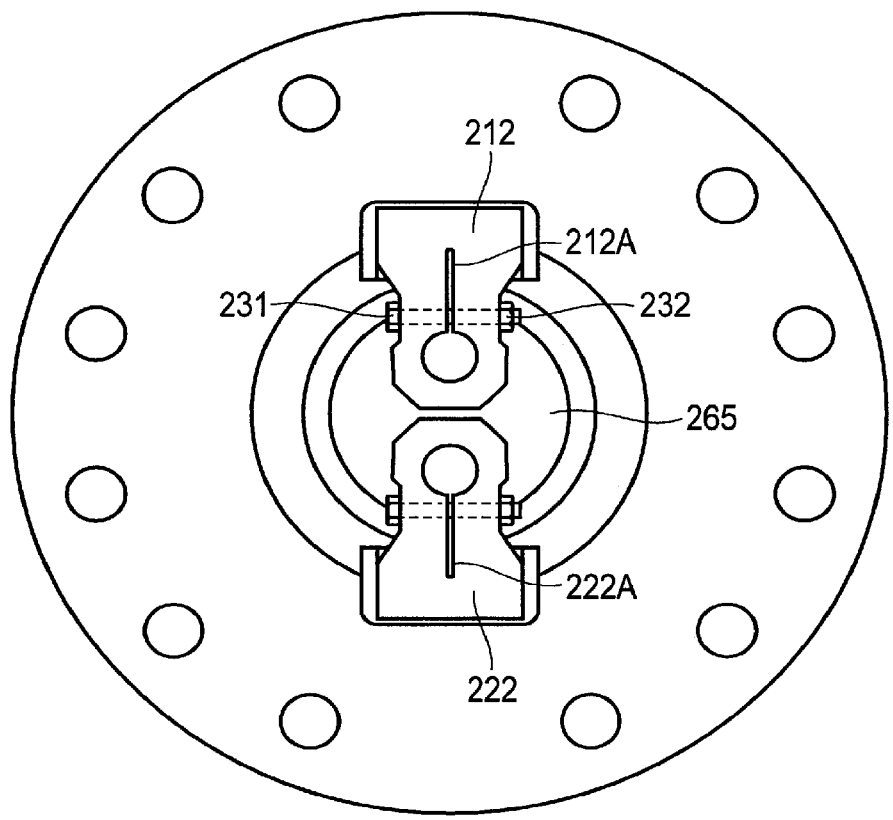
FIG. 4 is a sectional view taken along line B-B in FIG. 2 and depicting the example of the end of the rotor in the electric rotating machine in the first embodiment.
Figure 5:
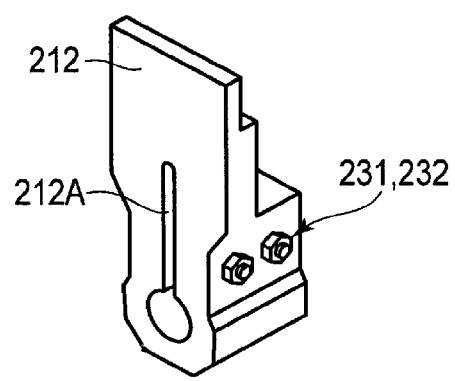
FIG. 5 is a perspective view of an end conductor depicted of a rotor of the electric rotating machine in the first embodiment.
Figure 6:
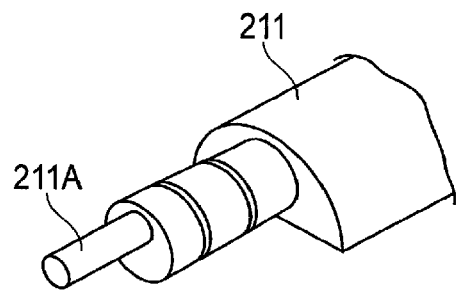
FIG. 6 is a perspective view of an end conductor depicted of a rotor of the electric rotating machine in the first embodiment.

First, an electric rotating machine in a first embodiment will be described with reference to FIG. 1, FIG. 2, FIG. 3, FIG. 4, FIG. 5, and FIG. 6. FIG. 1 is a diagram depicting an example of an electric rotating machine in the first embodiment. FIG. 2, FIG. 3, and FIG. 4 are sectional views depicting an example of an end of a rotor of the electric rotating machine in the first embodiment. FIG. 3 is an enlarged view of a portion A depicted in FIG. 2. FIG. 4 is a sectional view taken along line B-B in FIG. 2. FIG. 5 is a perspective view of an end conductor depicted in FIG. 2. FIG. 6 is a perspective view of a center hole conductor depicted in FIG. 2.

An electric rotating machine 1 depicted in FIG. 1 is a gas-cooled electric rotating machine in which a cooling gas is flowed through into a rotor 2 and a stator 3.

The stator 3 arranged on an outer periphery of the rotor 2 is attached to an inner surface of a stator frame (frame) 4. An end (to which a power feeding apparatus is connected) 2A of the rotor 2 extends through the stator frame 4 and is supported by a bearing 5 to seal, at a position closer to the center of the stator than the bearing 5, the cooling gas in the stator frame 4 with an oil seal 6.

A coil 7 installed on the rotor 2 to excite a core part 2B of the rotor 2 is externally supplied with power via collector rings 214, 224 of the end 2A.

As depicted in FIG. 2, the rotor 2 of the electric rotating machine 1 includes as a main component a shaft 20 with a center hole 201 formed in a central part thereof. The rotor 2 further includes as field circuit components the rotor coil 7, center hole conductors 211, 221, end conductors 212, 222, and radial studs 213, 223. The center hole conductor 211, the end conductor 212, and the radial stud 213 are positioned 180° away from the center hole conductor 221, the end conductor 222, and the radial stud 223 symmetrically with respect to a center of rotation L.

As depicted in FIG. 2, the rotor 2 has collector rings 214, 224. The collector rings 214, 224 are installed around an outer periphery of the shaft 20 extending outward of the stator frame 4. The collector rings 214, 224 are installed in juxtaposition in an axial direction of the shaft 20 so as to be insulated from the shaft 20 using an insulating member. Outer peripheral surfaces of the collector rings 214, 224 are electrically connected together by slidable movement with a power feeding brush. The insulation described below is electric insulation.

The center hole 201 and holes 202 for studs located at a machine interior side are formed at the end 2A. The center hole 201 is formed along the center of rotation L. The holes 202 for studs are located near the rotor coil 7 and extend in a radial direction so as to allow the center hole 201 to communicate with an outer peripheral surface of the shaft 20. As depicted in FIG. 2, the holes 202 for studs are formed line-symmetrically with respect to the center of rotation L, that is, 180° away from each other in a circumferential direction.

The pair of center hole conductors 211, 221 is inserted into the center hole 201 along the center of rotation L so as to be electrically insulated from the shaft 20 and from each other.

An insulating board 262 is interposed between the center hole conductors 211, 221 to electrically insulate the center hole conductors 211, 221 from each other. An insulating pipe 261 for the center hole conductors is installed between an inner periphery of the center hole 201 (which faces the center hole conductors 211, 221) and the center hole conductors 211, 221. An insulating block 263 is interposed between the end 2A and the pair of end conductors 212, 222.

An insulating board 264 is interposed between the end conductor 212 and an end surface of the shaft 20 so as to electrically insulate the end conductor 212 from the end surface. The insulating board 264 is also interposed between the end conductor 222 and the shaft 20.

Radial studs 213, 223 are inserted into the holes 202 for studs, located 180° away from each other and insulated from the shaft 20. The radial stud 213 electrically connects a lead conductor 7A of the rotor coil 7 and the center hole conductor 211 together. Similarly, the radial stud 223 electrically connects a lead conductor 7B of the rotor coil 7 and the center hole conductor 221 together.

The radial stud 213 is connected to an end of the rotor coil 7 via the lead conductor 7A. The rotor coil 7 is prepared as one of bend parts not depicted in the drawings. Similarly, the radial stud 223 is connected to the end of the rotor coil 7 via the lead conductor 7B.

The lead conductors 7A, 7B are housed in a slot along the center of rotation L. The slot is formed in the outer peripheral surface of the shaft 20.

As depicted in FIG. 2, at the end of the shaft 20, the end conductors 212, 222 are electrically connected to the collector rings 214, 224 on a one-to-one basis.

The collector rings 214, 224 are installed on the outer periphery of the end of the shaft 20 via an insulating pipe 271 for the collector rings. The collector rings 214, 224 are electrically connected together by slidable movement with the power feeding brush. The power feeding brush is attached to a power feeding apparatus installed outside of the collector rings 214, 224.

As depicted in FIG. 3, at an end of the center hole 201, an insulating plug 265 is housed which has through-holes 265A, 265B through which ends of center hole conductor 211, 221 extend. The insulating plug 265 is located at center hole conductor ends 211A, 221A to electrically insulate the shaft 20 from the center hole conductors 211, 221 and to seal the cooling gas.

A gasket 281 is fitted into a groove in an outer peripheral surface of an end of the center hole conductor 211 (more specifically, a part of the center hole conductor 211 located at the machine interior side with respect to the center hole conductor end 211A, which serves as a part of the center hole conductor 211 protruding toward the end of the shaft 20) so as to extend in the axial direction; the groove is formed so as to face an inner periphery of the through-hole 265A in the insulating plug 265. Consequently, a gas seal is formed between the outer peripheral surface of the end of the center hole conductor 211 and the insulating plug 265.

Similarly, a gasket 282 is fitted into a groove in an outer peripheral surface of an end of the center hole conductor 221 (more specifically, a part of the center hole conductor 221 located at the machine interior side with respect to the center hole conductor end 221A, which serves as a part of the center hole conductor 221 protruding toward the end of the shaft 20) so as to extend in the axial direction; the groove is formed so as to face an inner periphery of the through-hole 265B in the insulating plug 265. Consequently, a gas seal is formed between the above-described outer peripheral surface and the insulating plug 265.

A gasket 283 is fitted into a groove formed in an outer periphery of the insulating plug 265 such that the gasket 283 extends in the axial direction. In other words, the gasket 283 is arranged between the insulating plug 265 and the center hole 201 so as to extend in the axial direction. Consequently, a gas seal is formed between the insulating plug 265 and an inner peripheral surface of the center hole 201.

In other words, the gaskets 281, 282, 283 are arranged in the axial direction between each of the center hole conductor ends 211A, 221A and the insulating plug 265 and between the insulating plug 265 and the center hole 201 in the shaft 20 and to seal the cooling gas.

In the first embodiment, the center hole conductor ends 211A, 221A, which serve as protruding parts, are cylindrically formed. In the first embodiment, a hole is formed in the end conductor 212 so that the center hole conductor end 211A can be fitted into the hole. When a part of an outer peripheral surface of the center hole conductor end 211A (a side surface, that is, a surface with a circumferential component such as a circumferential surface with respect to a center line of the center hole conductor end 211A parallel to the center of rotation L) located at the end of the shaft serves as an electric connection surface, an inner peripheral surface of the above-described hole is connected to the electric connection surface. The hole has a bore diameter approximately equal to the outside diameter of the center hole conductor end 211A. The hole is formed to extend in the axial direction so as to have an axial length equal to the axial length of the outer peripheral surface of the center hole conductor end 211A.

Similarly, a hole is formed in the end conductor 222 so that the center hole conductor end 221A can be fitted into the hole. When a part of an outer peripheral surface of the center hole conductor end 221A (a side surface, that is, a surface with a circumferential component such as a circumferential surface with respect to a center line of the center hole conductor end 221A parallel to the center of rotation L) located at the end of the shaft serves as an electric connection surface, an inner peripheral surface of the above-described hole is connected to the electric connection surface. The hole has a bore diameter approximately equal to the outside diameter of the center hole conductor end 221A. The hole is formed to extend in the axial direction so as to have an axial length equal to the axial length of the outer peripheral surface of the center hole conductor end 221A. An inner peripheral surface of the hole formed in the end conductor 212 serves as an electric connection surface of the end conductor 212. Similarly, an inner peripheral surface of the hole formed in the end conductor 222 serves as an electric connection surface of the end conductor 222.

A slit 212A (in the end conductor 212) is formed in the end conductor 212 so as to communicate with the hole into which the center hole conductor end 211A can be fitted. Similarly, a slit 222A (in the end conductor 222) is formed in the end conductor 222 so as to communicate with the hole into which the center hole conductor end 221A can be fitted.

With the outer peripheral surfaces of the center hole conductor ends 211A, 221A fitted in the holes in the respective end conductor 212, 222, bolts 231 and nuts 232 can be attached to each of the end conductors 212, 222 so as to tighten the end conductor 212, 222.

The bolts 231 and the nuts 232 are tightening members intended to reduce the clearance (width) between the slits 212A, 222A. The slits 212A, 222A are formed to enable the width between the slits 212A, 222A to be reduced using the tightening members. The reduced clearance between the slits 212A, 222A allows a contact surface pressure to be applied to (1) the electric connection surfaces corresponding to the outer peripheral surface (side surface) of the center hole conductor end 211A and the inner peripheral surface of the hole in the end conductor 212 and to (2) the electric connection surfaces corresponding to the outer peripheral surface of the center hole conductor end 221A and the inner peripheral surface of the hole in the end conductor 222.

Specifically, as depicted in FIG. 3, the end conductor 212 is arranged closer to the end of the shaft 20 than the insulating plug 265. A cylindrical hole is formed in the end conductor 212 so that the cylindrical end 211A of the center hole conductor 211 (see FIG. 6) can be fitted into the cylindrical hole. As depicted in FIG. 4 and FIG. 5, the slit 212A is formed in a part of the hole.

Similarly, as depicted in FIG. 3, the end conductor 222 is arranged closer to the end of the shaft 20 than the insulating plug 265. A cylindrical hole is formed in the end conductor 222 so that the cylindrical end 221A can be fitted into the cylindrical hole. As depicted in FIG. 4, the slit 222A is formed in a part of the hole.

Now, with the center hole conductor ends 211A, 221A fitted in the end conductors 212, 222 on a one-to-one basis, a force is assumed to be applied in a direction in which the width between the slits 212A, 222A is reduced, by tightening the bolts 231 and the nuts 232. Consequently, the bore diameters of the holes in the end conductors 212, 222 are reduced to apply a contact surface pressure to the entire one-to-one contact surfaces corresponding to the inner peripheral surface of the hole in the end conductor 212 and the outer peripheral surface of the end 211A of the center hole conductor 211 and to the entire contact surfaces corresponding to the inner peripheral surface of the hole in the end conductor 222 and the outer peripheral surface of the end 221A of the center hole conductor 221. This allows a sufficiently large electric connection surface to be provided in a narrow space in the center hole 201.

In the electric rotating machine 1 in the first embodiment configured as described above, a field current from the a positive-electrode-side power feeding brush electrically connected to the outer periphery of the collector ring 214 by slidable movement is fed to the rotor coil 7 through the end conductor 212, the center hole conductor 211, and the radial stud 213 via the lead conductor 7A. The current then flows via the lead conductor 7B through the radial stud 223, the center hole conductor 221, and the end conductor 222 to return to the negative-electrode-side power feeding brush electrically connected to the outer periphery of the collector ring 224 by slidable movement.

The field current excites the core part 2B of the rotor 2. The rotor 2 is rotated by an external driving force exerted by a steam turbine etc., to generate an electromotive force in the stator, leading to power generation.

Therefore, in the first embodiment, a contact surface pressure can be efficiently and uniformly applied to (1) the entire contact surfaces corresponding to the inner peripheral surface of the hole in the end conductor 212 and the outer peripheral surface of the center hole conductor end 211A and to (2) the entire contact surfaces corresponding to the inner peripheral surface of the hole in the end conductor 222 and the outer peripheral surface of the center hole conductor end 221A without the need to significantly increase the sizes of the bolts 231 or the number of the bolts 231.

In the present embodiment, in the configuration in which the end conductors 212, 222 are arranged at the end 2A of the rotor 2, the contact area for electric connection can be substantially increased consistently with the current value even in the narrow space at the end of the center hole 201 without the need to form any radial hole other than the holes 202 for studs in the shaft 20.

When, for example, the electric rotating machine 1 provides a high output, the radial studs 213, 223 may be a plurality of radial studs arranged in the axial direction in order to limit field currents flowing through the individual radial studs.

Second Embodiment

Now, a second embodiment will be described with reference to the drawings. A basic configuration of the rotor 2 in the electric rotating machine 1 in embodiments described below is the same as the corresponding configuration in the first embodiment. Thus, components having the same functions throughout the embodiments have the same reference numerals throughout the drawings. For detailed description of these components, the description and drawings of the first embodiment may be referred to for comparison.

Instead of the configuration in which the collector rings 214, 224 come into contact with each other based on slidable movement of the brush, the second embodiment has a configuration in which a brushless exciting apparatus is used to supply a field current to the rotor coil 7 of the rotor 2.

Figure 7:
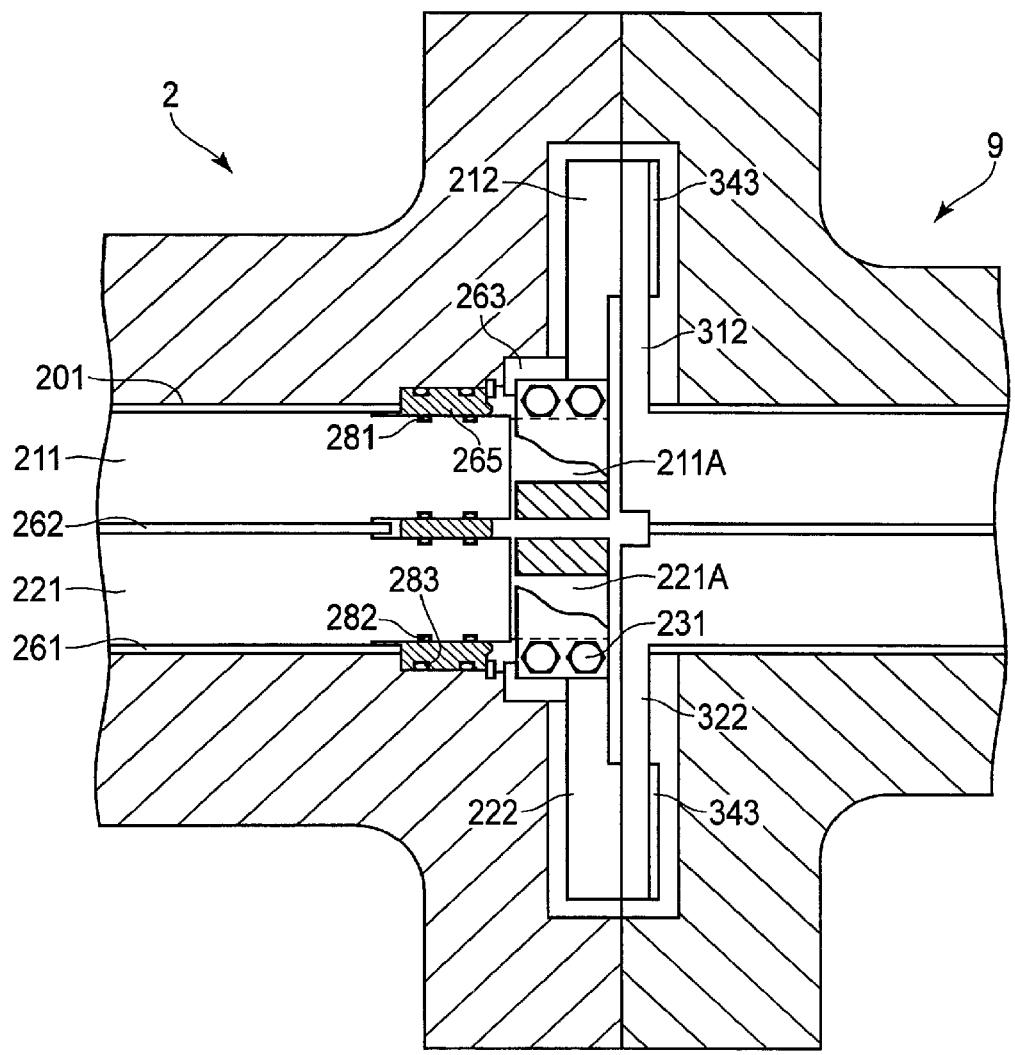
FIG. 7 is sectional view depicting an example of an end of a rotor of the electric rotating machine in a second embodiment.

FIG. 7 is a sectional view depicting an example of the end of the rotor in the electric rotating machine in the second embodiment. As depicted in FIG. 7, in the second embodiment, a rotor 9 in a brushless exciting apparatus is coupled to the end surface of the rotor 2 via a shaft coupling to electrically connect the end conductors 212, 222 to output conductors 312, 322 of the rotor 9 in the brushless exciting apparatus on a one-to-one basis. Consequently, the brushless exciting apparatus can supply a field current to the rotor coil 7 of the rotor 2.

In other words, electric connection surfaces corresponding to end surfaces of the output conductors 312, 322 of the rotor 9 in the brushless exciting apparatus are coupled to the end surface of the rotor 2 in the electric rotating machine 1 via the shaft coupling. Thus, a contact surface pressure is applied to the electric connection surfaces corresponding to the end surfaces of the end conductors 212, 222 and to the electric connection surfaces corresponding to the end surfaces of the output conductors 312, 322 to electrically connect the end conductor 212 and the output conductors 312 together while electrically connecting the end conductor 222 and the output conductor 322 together.

Consequently, when the brushless exciting apparatus is used, the contact area for electric connection can also be significantly increased consistently with the current value.

A higher contact surface pressure can be applied to the electric connection surfaces by, for example, installing springs 343 on a back side of the output conductors 312, 322 as seen from the vicinities of one and the other radial ends of the electric connection surface of each of the output conductors 312, 322.

Third Embodiment

Now, a third embodiment will be described with reference to FIG. 8 and FIG. 9.

FIG. 8 and FIG. 9 are sectional views of an example of an end of a rotor in an electric rotating machine in the third embodiment as viewed in the radial direction.

In the third embodiment, the outer peripheries (side surfaces) of the center hole conductor ends 211A, 221A are each shaped like a cone such that the diameter of the outer periphery decreases consistently with the distance to the end of the shaft 20 as viewed from the machine interior side. In the third embodiment, the outer peripheries of the center hole conductor ends 211A, 221A have respective first inclinations to the center lines of the center hole conductor ends 211A, 221A parallel to the center of rotation L. That is, the outer peripheral surfaces (side surfaces) of the center hole conductor ends 211A, 221A, which correspond to protruding parts of the center hole conductors 211, 221, are inclined to the circumferential surfaces with respect to the center of rotation L.

The shapes of the holes in the end conductors 212, 222 generally conform to the outer peripheries of the respective center hole conductor ends 211A, 221A, which are fitted into the holes in the end conductors 212, 222. The electric connection surface arranged on the inner peripheral surface of each of the holes formed in the end conductors 212, 222 has a second inclination smaller than the first inclination with respect to the center line of the hole parallel to the center of rotation L. The inner peripheral surfaces of the holes serving as the electric connection surfaces of the end conductors 212, 222 are inclined to the circumferential surfaces with respect to the center of rotation L.

With the ends 211A, 221A, of the center hole conductors 211, 221 fitted in the holes formed in the respective end conductors 212, 222, a clearance is formed between each of the holes in the end conductors 212, 222 and the outer periphery of the corresponding center hole conductor 211A, 221A.

In the third embodiment, to reduce the clearance, the bolts 231 and the nuts 232 can be attached to a side of each end conductor 212, 222 which has a smaller conical diameter, in other words, the side closer to the end of the rotor 2.

Specifically, as depicted in FIG. 8 and FIG. 9, in the third embodiment, the inclination (second inclination) of the inner periphery of the hole in the end conductor 212 is smaller than the inclination (first inclination) of the outer periphery of the center hole conductor 211A. The inclination of the inner periphery of the hole in the end conductor 222 is smaller than the inclination of the outer periphery of the center hole conductor 221A.

The bolts 231 and the nuts 232 are arranged in an area of each of the end conductors 212, 222 which is closer to the end of the rotor 2. Consequently, when the bolts 231 and the nuts 232 start to be tightened in a direction in which the clearance between the hole in each of the end conductors 212, 222 and the outer periphery of the corresponding center hole conductor end 211A, 221A decreases, a contact surface pressure starts to be applied to the machine interior-side electric connection surface at a timing earlier than a timing when a contact surface pressure starts to be applied to the rotor end-side electric connection surface. Then, the bolts 231 and the nuts 232 are further tightened to finally apply the contact surface pressure to the entire electric connection surfaces.

As described above, in the third embodiment, for a further increase in field current, the electric connection surfaces corresponding to the inner peripheral surface of the hole in each end conductor and the outer peripheral surface of each of the center hole conductor ends are increased in size from the outside to inside of the center hole 201. Therefore, even when the bolts 231 and the nuts 232 are arranged only at the rotor end side where an operation of tightening the bolts 231 and the nuts 232 can be performed, the contact surface pressure can be applied even to the inside of the center hole 201. Thus, necessarily and sufficiently large electric connection surfaces can be provided.

Fourth Embodiment

Figure 10:
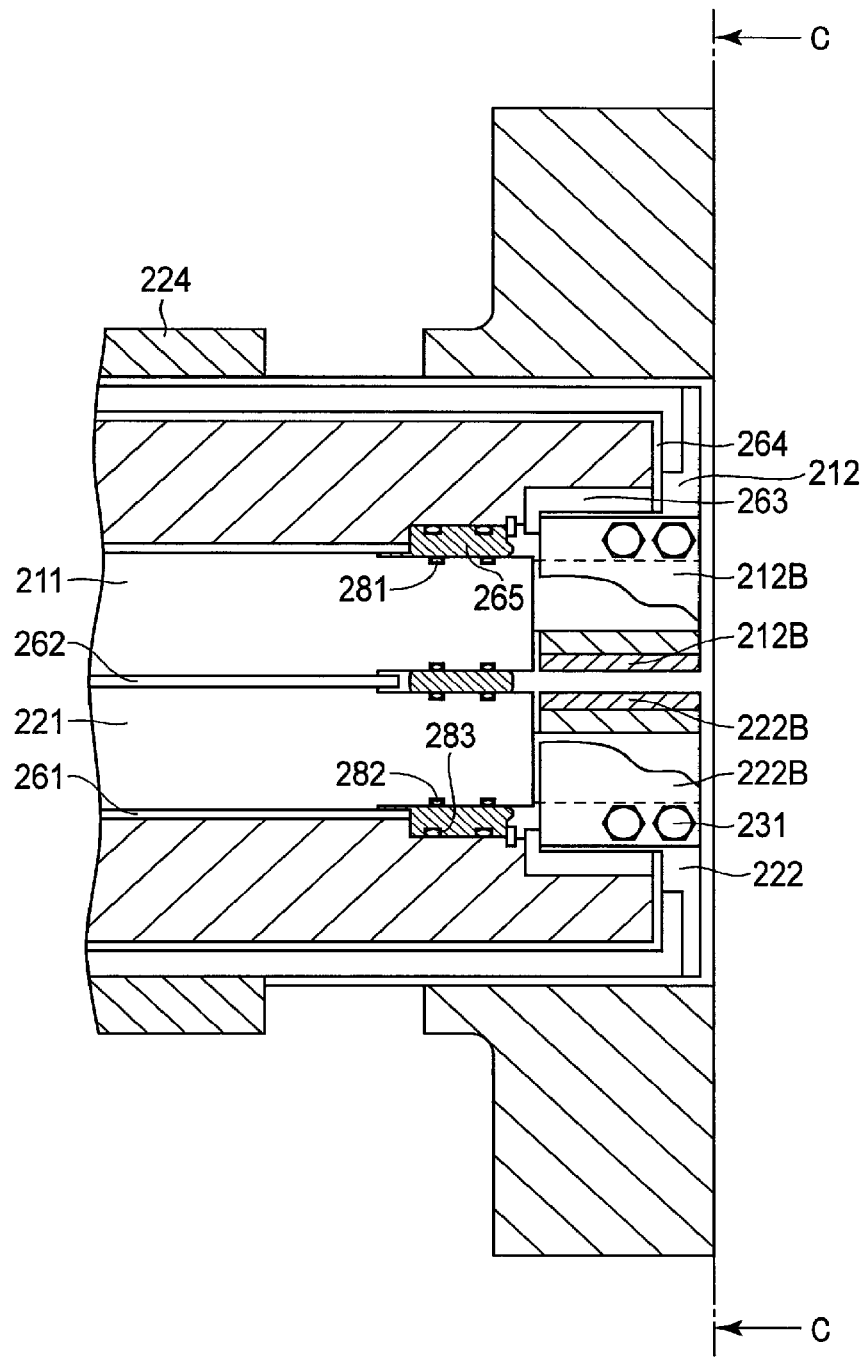
FIG. 10 is sectional view depicting an example of an end of a rotor of the electric rotating machine in a fourth embodiment.
Figure 11:
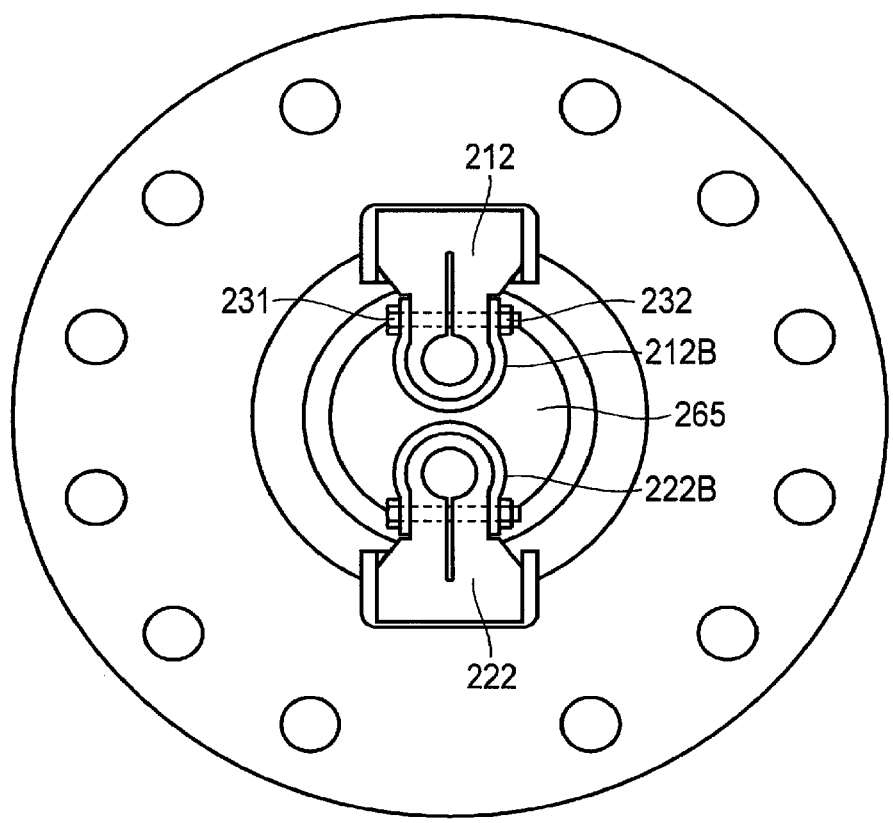
FIG. 11 is a sectional view taken along line C-C in FIG. 10 and depicting the example of the end of the rotor in the electric rotating machine in the fourth embodiment.
Figure 12:
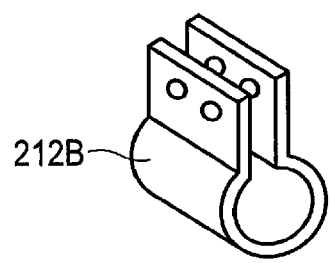
FIG. 12 is a perspective view depicting the example of the end of the rotor in the electric rotating machine in the fourth embodiment.

Now, a fourth embodiment will be described with reference to FIG. 10, FIG. 11, and FIG. 12. FIG. 10 is a sectional view depicting an example of an end of a rotor in an electric rotating machine in the fourth embodiment as seen in the radial direction. FIG. 11 is a sectional view taken along line C-C in FIG. 10 and depicting the example of the end of the rotor in the electric rotating machine in the fourth embodiment. FIG. 12 is a perspective view depicting the example of the end of the rotor in the electric rotating machine in the fourth embodiment.

As depicted in FIG. 10 and FIG. 11, in the fourth embodiment, a part of the outer periphery of each of the end conductors 212, 222 located near the electric connection surfaces of the end conductor 212, 222 and the corresponding center hole conductor end 211A, 221A is cylindrical. This cylindrical area is hereinafter referred to as a cylindrical part. Outer casings 212B, 222B having a higher rigidity than the material of the member of the cylindrical part can each be arranged over the corresponding cylindrical part on a one-to-one basis using the bolts 231 and the nuts 232. The outer casings 212B, 222B are, for example, spring steel.

In general, the end conductors 212, 222 are formed of a material such as copper which offers a small electric resistance. However, such a material does not have a high rigidity, and thus, the end conductors 212, 222 may be deformed.

In the fourth embodiment, the rigidity of the end conductors 212, 222 is supplemented using the outer casings having a high rigidity as described above. Consequently, the shape of the cylindrical parts of the end conductors 212, 222 can be kept constant. Therefore, stable electric connection can be maintained between the inner peripheral surface of the hole in each end conductor 212, 222 and the outer peripheral surface of the corresponding center hole conductor 211A, 221A.

Similar effects are expected to be able to be produced when the outer casings 212B, 222B are applied to the third embodiment.

Fifth Embodiment

Figure 13:
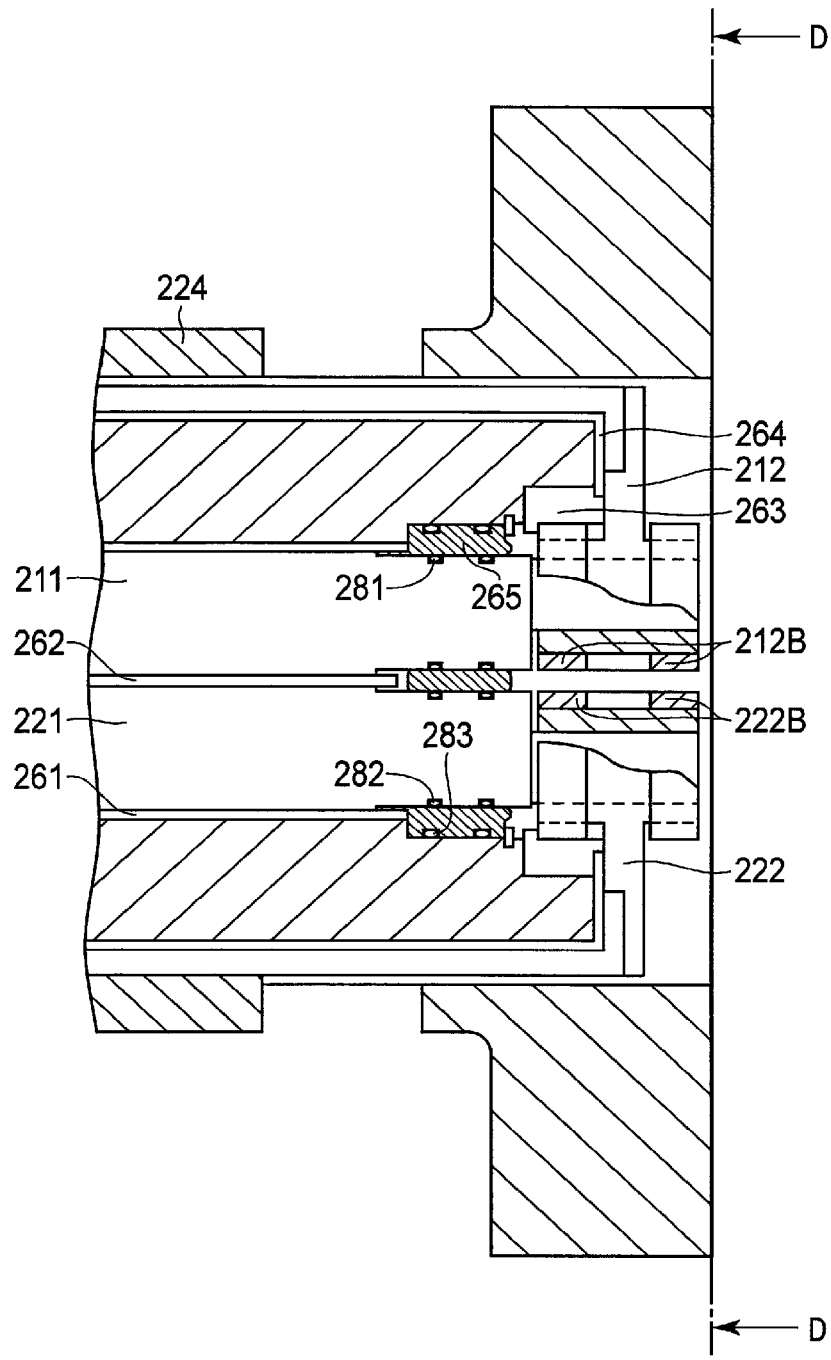
FIG. 13 is a sectional view depicting an example of an end of a rotor in an electric rotating machine in a fifth embodiment.

Now, a fifth embodiment will be described with reference to FIG. 13, FIG. 14, and FIG. 15. FIG. 13 is a sectional view depicting an example of an end of a rotor in an electric rotating machine in the fifth embodiment as seen in the radial direction. FIG. 14 is a sectional view taken along line D-D in FIG. 13 and depicting the example of the end of the rotor in the electric rotating machine in the fifth embodiment. FIG. 15 is a perspective view depicting the example of the end of the rotor in the electric rotating machine in the fifth embodiment.

As depicted in FIG. 13, FIG. 14, and FIG. 15, the fifth embodiment does not use the bolts 231 or the nuts 232 as described in the fourth embodiment. In the fifth embodiment, slits are formed in the respective outer casings, with spacers inserted into the respective slits. This allows the bore diameters of the outer casings 212B, 222B to be expanded. The outer casings 212B, 222B with the expanded bore diameters can be placed over the outer peripheries of the cylindrical parts of the respective end conductors 212, 222 on a one-to-one basis.

The outer casings 212B, 222B are produced such that, when the outer casings 212B, 222B are not placed over the outer peripheries of the cylindrical parts of the respective end conductors 212, 222 as described above, that is, when the bore diameters of the outer casings 212B, 222B are not expanded, the bore diameter of each of the outer casings 212B, 222B is smaller than the outside diameter of the corresponding end conductor 212, 222 obtained when the center hole conductor ends 211A, 221A have been fitted into the holes in the respective end conductors 212, 222 over which the corresponding outer casings 212B, 222B have not been placed.

The operation of fitting the center hole conductor ends 211A, 221A into the holes in the respective end conductors 212, 222 can be performed after the bore diameters of the outer casings 212B, 222B are expanded by, for example, inserting spacers into the slits in the outer casings 212B, 222B as described above, with the outer casings 212B, 222B placed over the outer peripheries of the cylindrical parts of the end conductors 212, 222 on a one-to-one basis. Then, after the center hole conductor ends 211A, 221A are fitted into the holes in the respective end conductors 212, 222 on a one-to-one basis, an operation of drawing the spacers out from the slits in the outer casings 212B, 222B can be performed.

When the spacers are drawn out from the slits in the outer casings 212B, 222B as described above, force is generated to restore the bore diameters of the outer casings 212B, 222B to the original state. In the fifth embodiment, this force is utilized to allow a contact surface pressure to be applied to the electric connection surfaces corresponding to the inner peripheral surface of the hole in each of the end conductors 212, 222 and the outer peripheral surface of the corresponding center hole conductor ends 211A, 221A.

This method allows the contact surface pressure to be applied to the electric connection surfaces corresponding to the inner peripheral surface of the hole in each of the end conductors 212, 222 and the outer peripheral surface of the corresponding end 211A, 221A of the center hole conductor 211, 221 without using any bolts or nuts. This eliminates the need for an operation space for the operation of tightening bolts and nuts. Similar effects are expected to be able to be produced when the outer casings 212B, 222B described in the fifth embodiment are applied to the third embodiment.

Sixth Embodiment

Figure 16:
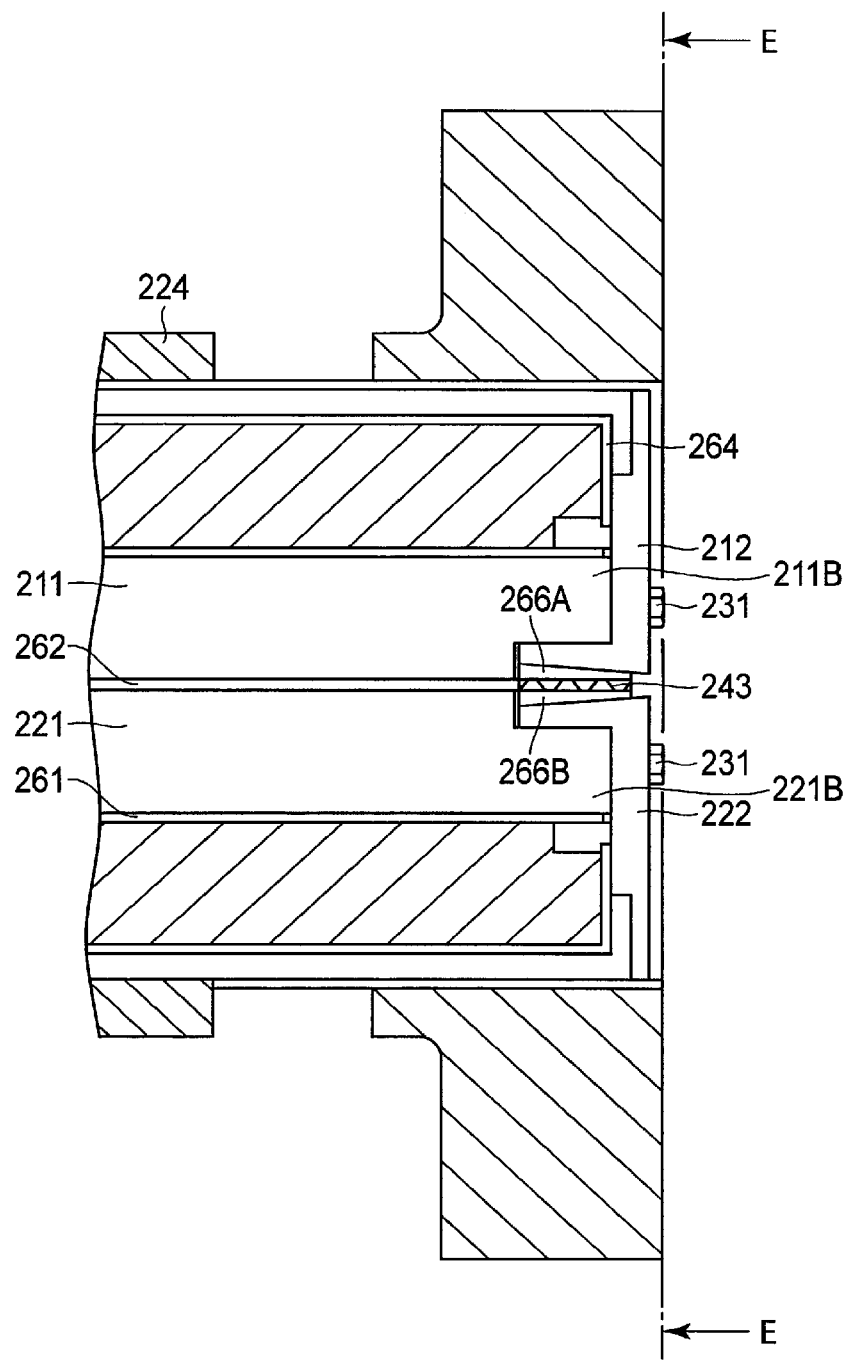
FIG. 16 is a sectional view depicting an example of an end of a rotor in an electric rotating machine in the sixth embodiment.
Figure 17:
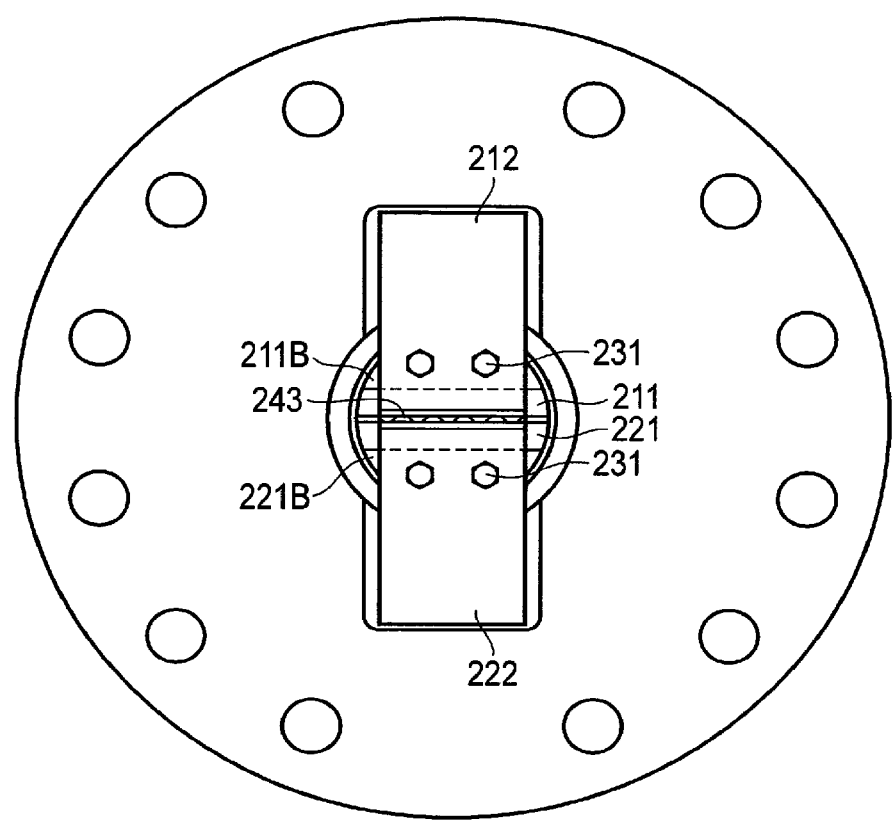
FIG. 17 is a sectional view taken along line E-E in FIG. 16 and depicting the example of the end of the rotor in the electric rotating machine in the sixth embodiment.

Now, a sixth embodiment will be described with reference to FIG. 16 and FIG. 17. FIG. 16 is a sectional view depicting an example of an end of a rotor in an electric rotating machine in the sixth embodiment as seen in the radial direction. FIG. 17 is a sectional view taken along line E-E in FIG. 16 and depicting the example of the end of the rotor in the electric rotating machine in the sixth embodiment.

Unlike the configuration including the cylindrical center hole conductor ends 211A, 221A which correspond to protruding parts and the side surfaces of which serve as electric connection surfaces fitted into the holes formed in the respective end conductors as described in the first embodiment, a configuration in the sixth embodiment includes center hole conductor ends 211B, 221B corresponding to protruding parts of the center hole conductors 211, 221 which are closer to the end of the rotor, the center hole conductor ends 211B, 221B being formed by cutting out a part of the rotor end side of each of the center hole conductors 211, 221 which part is closer to the center of rotation L (that is, closer to the insulating board 262). In other words, a part of each of the center hole conductors 211, 221 is spaced from a bottom surface thereof facing the insulating board 262, that is, a part of the side surface of each center hole conductor 211, 221 is spaced from the center of rotation L. This part serves as the center hole conductor end 211B, 221B corresponding to the protruding part located closer to the end of the rotor. The center hole conductor ends 211B, 221B are electrically insulated from each other and from the shaft 20.

In the present embodiment, a part of the side surface of each of the center hole conductor ends 211B, 221B which part is closer to the center of rotation L is cut out. In this configuration, electric connection surfaces correspond to a first flat surface (on the center hole conductor 211) and a second flat surface (on the center hole conductor 221) which are included in the side surfaces of the center hole conductor ends 211B, 221B and which do not face the inner surface of the center hole 201. In particular, in the present embodiment, the first flat surface and the second flat surface are configured as surfaces which are spaced in a normal direction from the bottom surface of each center hole conductor facing the insulating board 262 and which are generally parallel to the bottom surface. The first flat surface and the second flat surface corresponding to the electric connection surfaces may be configured as surfaces located at a predetermined angle to the surface facing the insulating board 262 instead of the surfaces parallel to the surface facing the insulating board 262. Alternatively, the entire side surfaces of the center hole conductor ends 211B, 221B may serve as the electric connection surfaces.

That is, in the present embodiment, when the center hole conductors 211, 221, electrically insulated from each other via the insulating board 262, are inserted into the center hole 201 along the center of rotation L, a recess is formed so as to stride across a straight line horizontal to the center of rotation L at which the insulating board 262 is disposed, as viewed from the end of the shaft 20. The recess is provided with the first flat surface of the center hole conductor 211 and the second flat surface of the center hole conductor 221. The flat surfaces face each other via a straight line horizontal to the center of rotation L at which the insulating board 262 is disposed.

The end conductor 212 is provided with a generally L-shaped first end conductor protruding part having an electric connection surface connected to the first flat surface corresponding to an electric connection surface of the center hole conductor 211. The end conductor 222 is provided with a generally L-shaped second end conductor protruding part having an electric connection surface connected to the second flat surface corresponding to an electric connection surface of the center hole conductor 221.

The first and second end conductor protruding parts are formed to provide a space near the center of rotation L where pressure wedges and a spring described below can be arranged when the first and second end conductor protruding parts are electrically connected to the first and second flat surfaces of the center hole conductors 211, 221 on a one-to-one basis.

That is, the pressure wedges which are electric insulators insulating the paired first and second end conductor protruding parts can each be arranged in a space between the first and second end conductor protruding parts. Specifically, a pressure wedge 266A and a pressure wedge 266B are arranged in the space in the radial direction with a predetermined clearance between the pressure wedges 266A and 266B where the spring described below can be located.

The pressure wedge 266A lies opposite to a surface of the first end conductor protruding part of the end conductor 212 which surface is closer to the center of rotation L, the end conductor 212 being electrically connected to the first flat surface of the protruding part of the center hole conductor 211.

The pressure wedge 266B lies opposite to a surface of the second end conductor protruding part of the end conductor 222 which surface is closer to the center of rotation L, the end conductor 222 being electrically connected to the second flat surface of the protruding part of the center hole conductor 221.

Thus, the pressure wedge 266A arranged as described above has the surface lying opposite to the first end conductor protruding part, and the pressure wedge 266B arranged as described above has the surface lying opposite to the second end conductor protruding part. These surfaces are formed as inclined surfaces having a predetermined inclination to the center of rotation L such that the distance from the center of rotation L to each of the surfaces increases from the rotor end side toward the machine interior side.

A spring 243 can be inserted into the clearance between the pressure wedges 266A, 266B arranged as described above.

As described above, the first end conductor protruding part has the surface lying opposite to the pressure wedge 266A, and the second end conductor protruding part has the surface lying opposite to the pressure wedge 266B. These surfaces are also formed as inclined surfaces having a predetermined inclination equal to the inclination of the pressure wedges 266A, 266B such that the distance from the center of rotation L to each of the surfaces increases from the rotor end side toward the machine interior side.

In the sixth embodiment, the bolt 231 is screwed into each of the end conductors 212, 222 in the axial direction. The screwing allows the end conductors 212, 222 to be pushed from the end of the shaft 20 toward the machine interior side. Each of the inclined surfaces of the pressure wedges 266A, 266B is subjected to force to compress the spring 243 between the pressure wedges 266A, 26B. This causes the spring 243 to exert a repulsive force. The repulsive force allows a contact surface pressure to be applied to the electric connection surfaces of the end conductor 212 and the rotor end side of the center hole conductor 211 and to the electric connection surfaces of the end conductor 222 and the rotor end side of the center hole conductor 221.

As described above, the sixth embodiment can produce effects similar to the effects of the first embodiment even if an air cooled electric rotating machine which needs no gas structure is used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A gas cooled electric rotating machine in which, in operation, a cooling gas is flowed through into a rotor and a stator, wherein the rotor comprises:
a shaft having a center hole formed along a center of rotation of the rotor;
a pair of collector rings installed around an outer periphery of the shaft;
a hole for studs formed at a machine interior side of the center hole so as to extend in a radial direction from the center hole to an outer peripheral surface of the rotor to allow the center hole and the outer peripheral surface to communicate with each other;
a pair of center hole conductors inserted into the center hole along the center of rotation while being electrically insulated from the shaft and from each other, the center hole conductors including respective end parts extending along an axial direction of an end of the shaft, wherein each of the end parts comprises a circumferential surface with respect to a center line of the end parts parallel to the center of rotation, said circumferential surface serving as an electric connection surface; and
a pair of end conductors provided at the end of the shaft so as to be each electrically insulated from the shaft,
wherein each of the end conductors has a hole so that the respective end part can be fitted into the hole and electrically connected thereto in a manner that an inner peripheral surface of the hole is connected to the circumferential surface of the respective end part of the pair of center hole conductors, and
wherein each of the end conductors is electrically connected to a respective one of the pair of collector rings.

2. The electric rotating machine according to claim 1, wherein
the end conductors are provided with respective slits which communicate with the corresponding holes, and
the slits are formed so as to enable a width between the slits to be reduced using tightening members.

3. The electric rotating machine according to claim 1, wherein
circumferential surfaces of the end parts at ends of the center hole conductors are inclined to a circumferential surface with respect to the center between the end parts.

4. The electric rotating machine according to claim 1, further comprising:
an insulating plug located at ends of the center hole conductors to electrically insulate the center hole conductors from the shaft and to seal the cooling gas; and
gaskets arranged in the axial direction between the end of each of the center hole conductors and the insulating plug and between the insulating plug and the center hole in the shaft to seal the cooling gas.

5. The electric rotating machine according to claim 2, further comprising:
an insulating plug located at ends of the center hole conductors to electrically insulate the center hole conductors from the shaft and to seal the cooling gas; and
gaskets arranged in the axial direction between the end of each of the center hole conductors and the insulating plug and between the insulating plug and the center hole in the shaft to seal the cooling gas.

6. The electric rotating machine according to claim 3, further comprising:
an insulating plug located at ends of the center hole conductors to electrically insulate the center hole conductors from the shaft and to seal the cooling gas; and
gaskets arranged in the axial direction between the end of each of the center hole conductors and the insulating plug and between the insulating plug and the center hole in the shaft to seal the cooling gas.

7. A manufacturing method for an electric rotating machine, the manufacturing method comprising:
preparing a rotor comprising a shaft having a center hole formed along a center of rotation of the rotor, a pair of collector rings installed around an outer periphery of the shaft, and a hole for studs formed at a machine interior side of the center hole so as to extend in a radial direction from the center hole to an outer peripheral surface of the rotor to allow the center hole and the outer peripheral surface to communicate with each other;
inserting a pair of center hole conductors including respective end parts extending along an axial direction of an end of the shaft, into the center hole along the center of rotation such that the center hole conductors are electrically insulated from the shaft and from each other, wherein each of the end parts comprises a circumferential surface with respect to a center line of the end parts parallel to the center of rotation, said circumferential surface serving as an electric connection surface; and
electrically connecting a pair of end conductors, which are electrically insulated from the shaft and are electrically connected to a respective one of the pair of collector rings, to the circumferential surfaces of the end parts of the pair of center hole conductors, respectively, in a manner that each of the end parts is fitted into a hole of the respective end conductor and is electrically connected thereto in a manner that an inner peripheral surface of the hole is connected to the circumferential surface of the respective end part.

* * * * *